United States Patent [19]

Taplin

[11] 4,002,077
[45] Jan. 11, 1977

[54] INTEGRATING ANGULAR ACCELEROMETER
[75] Inventor: Lael Brent Taplin, Royal Oak, Mich.
[73] Assignee: The Bendix Corporation, South Bend, Ind.
[22] Filed: Mar. 6, 1975
[21] Appl. No.: 555,924
[52] U.S. Cl. .................................. 73/503; 73/515; 73/521
[51] Int. Cl.² ...................... G01P 3/26; G01P 15/02
[58] Field of Search ................. 73/503, 515, 516 R, 73/516 LM, 517 A, 521

[56] References Cited
UNITED STATES PATENTS

| 3,311,987 | 4/1967 | Blazek | 73/505 X |
| 3,587,327 | 6/1971 | Desthuilliers | 73/521 X |

FOREIGN PATENTS OR APPLICATIONS

| 1,013,271 | 12/1965 | United Kingdom | 73/515 |

Primary Examiner—James J. Gill
Attorney, Agent, or Firm—Leo H. McCormick, Jr.; S. H. Hartz

[57] ABSTRACT

An integrating angular accelerometer for measuring angular rate of a rotating body has a stationary cylindrical inertial mass supported by a low drag hydrostatic bearing concentrically in a housing rotatable relative thereto and filled with a viscous fluid. An annular channel of laminar dimensions is formed between the inertial mass and housing and a vane is arranged in the channel to block fluid flow caused by rotation of the housing relative to the inertial mass. The differential pressure in the channel at opposite sides of the vane provides a signal corresponding to the rate of rotation of the housing relative to the inertial mass.

28 Claims, 10 Drawing Figures

U.S. Patent  Jan. 11, 1977  Sheet 1 of 4  4,002,077
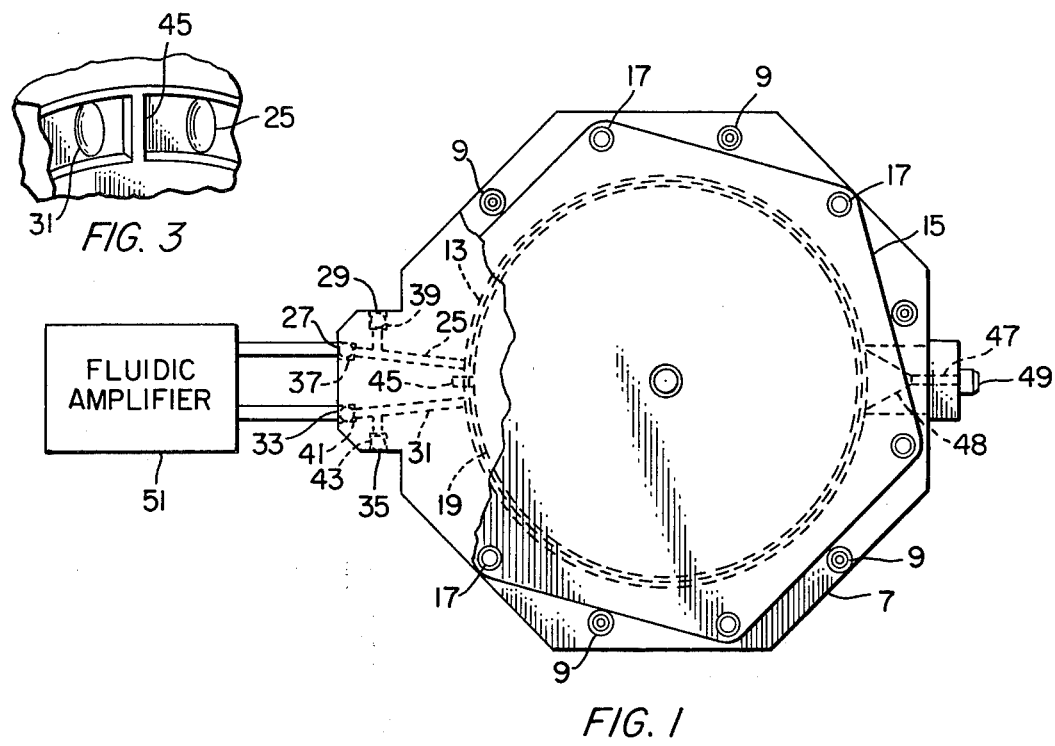
FIG. 3
FIG. 1
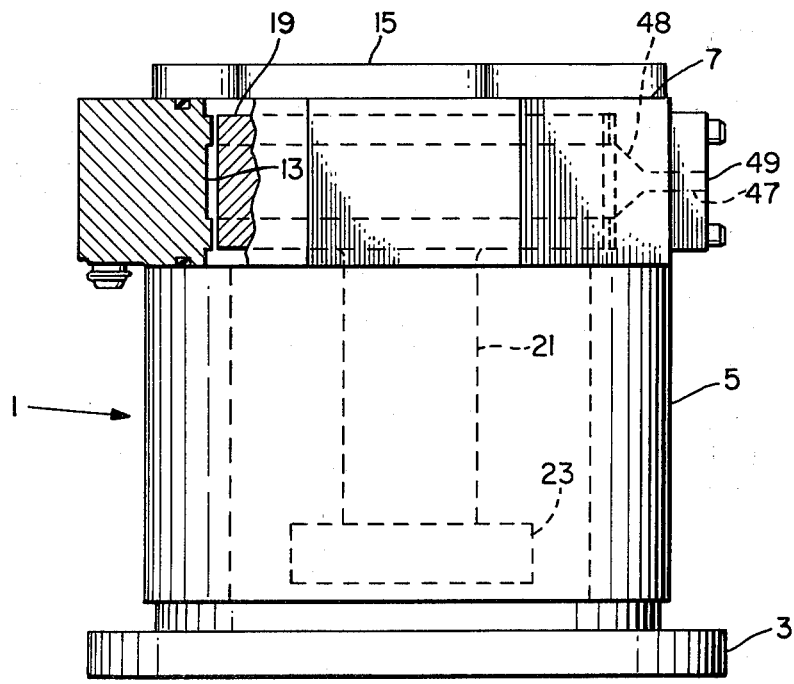
FIG. 2

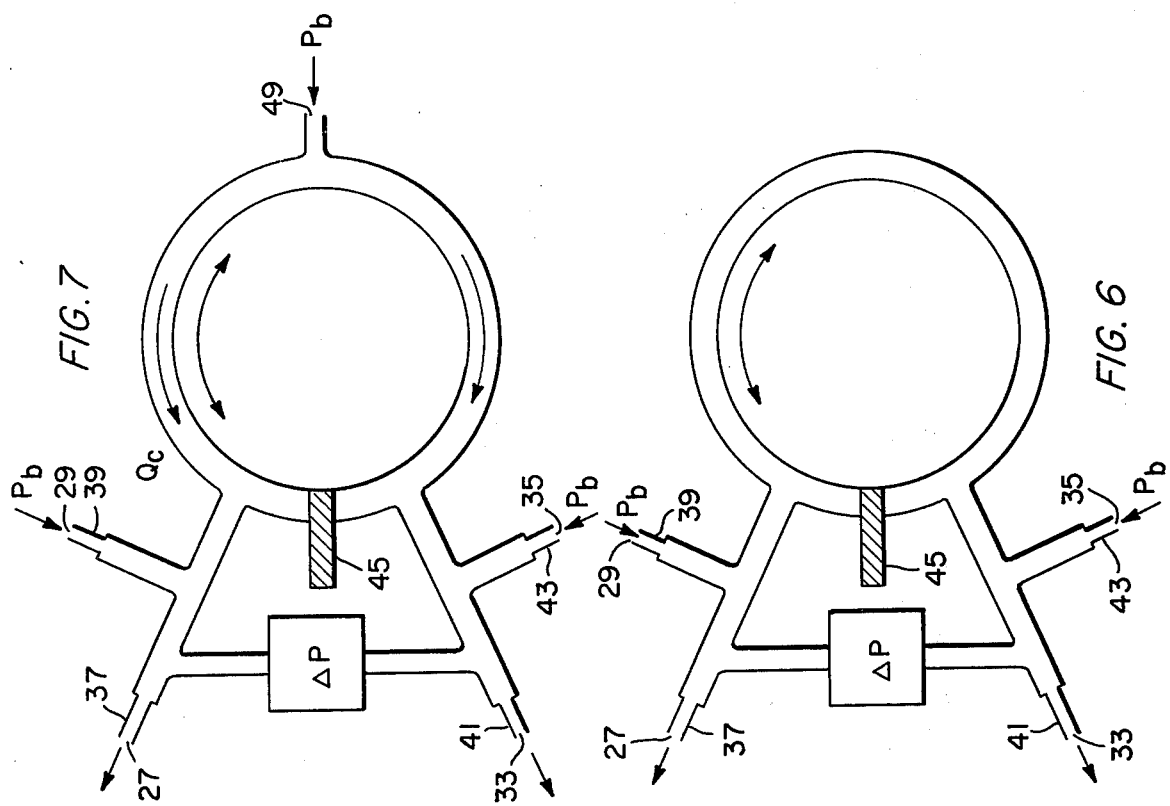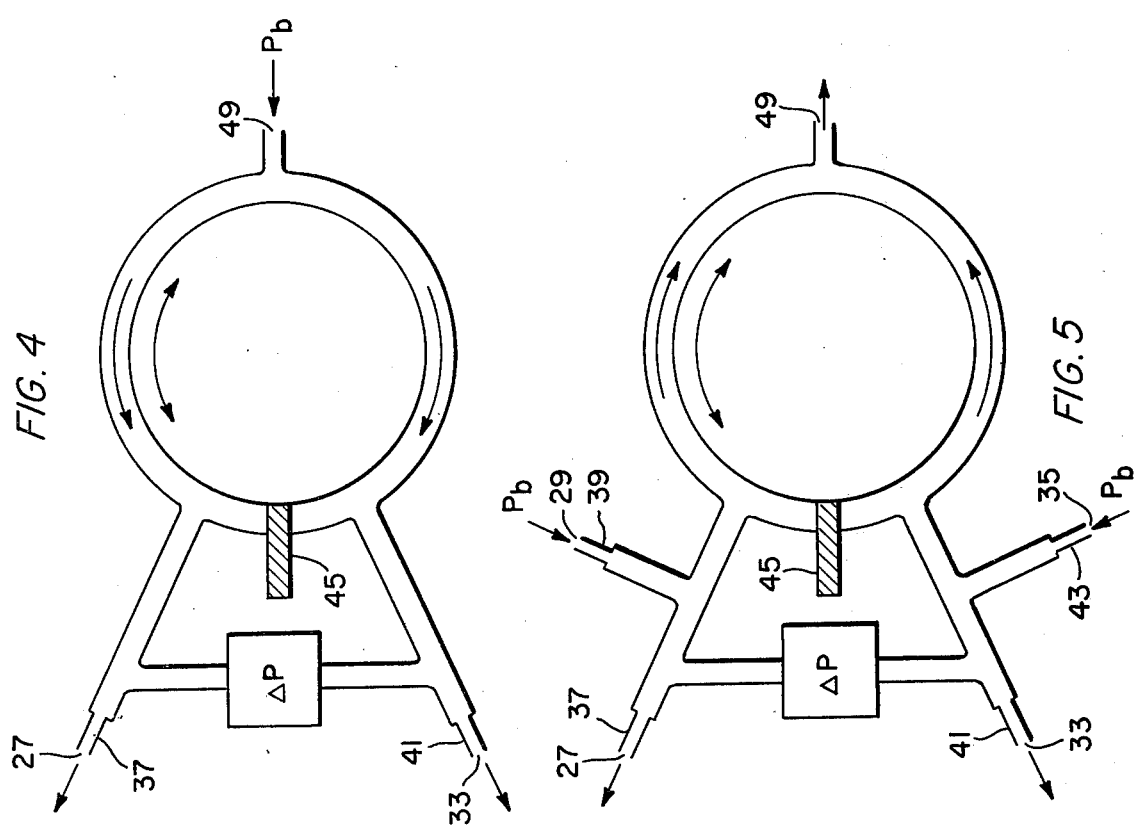

INTEGRATING ANGULAR ACCELEROMETER

FIELD OF THE INVENTION

The invention relates to integrating angular accelerometers for measuring angular rate of a rotating body. An accelerometer constructed according to the invention may be used to detect swaying action of a trailor towed by a tow vehicle and operate the braking system of the trailer automatically to prevent the trailer from jackknifing. The accelerometer may also be used in a computing sight for sighting a weapon and in a navigation system.

PRIOR ART

Angular accelerometers as used heretofore, such as shown and described in U.S. Pat. No. 3,819,234, provide acceleration signals and, in order to obtain angular rate, the signals must be integrated, usually by electronic means. Noise is a serious problem which must be overcome to provide useful angular rate signals.

SUMMARY OF THE INVENTION

The present invention is directed to an integrating angular accelerometer which has a cylindrical inertial mass supported by a low drag hydrostatic bearing concentrically in a housing which may be attached to a vehicle. An annular channel of laminar dimensions is provided between the inertial mass and housing and may be formed in either. The housing, including the channel is filled with viscous fluid and the inertial mass is supported in the fluid. When the housing rotates relative to the inertial mass upon angular acceleration of the vehicle a pressure differential proportional to angular rate is provided across two pick-off ports connected to the annular channel because of the viscous pumping effect caused by relative motion between the housing and inertial mass.

An integrating accelerometer constructed according to the invention provides signals of a relatively large bandwith and the signals are substantially noise free because no external electronic circuitry is required. The device is relatively simple in construction in that it comprises only two parts; that is, an inertial mass or wheel supported by a hydrostatic bearing and a housing filled with viscous fluid.

The invention contemplates an integrating angular accelerometer for measuring angular rate of a rotating body, comprising a housing, an inertial mass positioned in the housing and arranged for relative rotation with respect to the housing, a viscous fluid in the housing, the inertial mass and housing forming an annular channel therebetween located about the acceleration sensitive axis and dimensioned to cause fluid flow upon relative rotation of the housing and inertial mass in the direction of relative rotation, means for blocking fluid flow in the channel to provide a differential pressure across the blocking means corresponding to relative angular rotation of the inertial mass and housing, and means for sensing the differential pressure across the blocking means to provide a signal corresponding thereto.

DRAWINGS

FIG. 1 is a top view partly cutaway of an intergrating accelerometer constructed according to the invention.

FIG. 2 is a side view partly in section of the integrating accelerometer shown in FIG. 1, FIG. 3 shows a detail of the housing, FIGS. 4, 5, 6 and 7 are schematic diagrams showing several biasing arrangements for the integrating accelerometer shown in FIG. 1, FIG. 8 is a vertical section taken approximately on the line 8—8 of FIG. 9 showing another embodiment of the invention, FIG. 9 is a horizontal section taken approximately on the line 9—9 of FIG. 8, and FIG. 10 shows a low frequency wash out circuit for use with an integrating angular accelerometer constructed according to the invention.

DETAILED DESCRIPTION OF THE DRAWINGS

Figure 8:
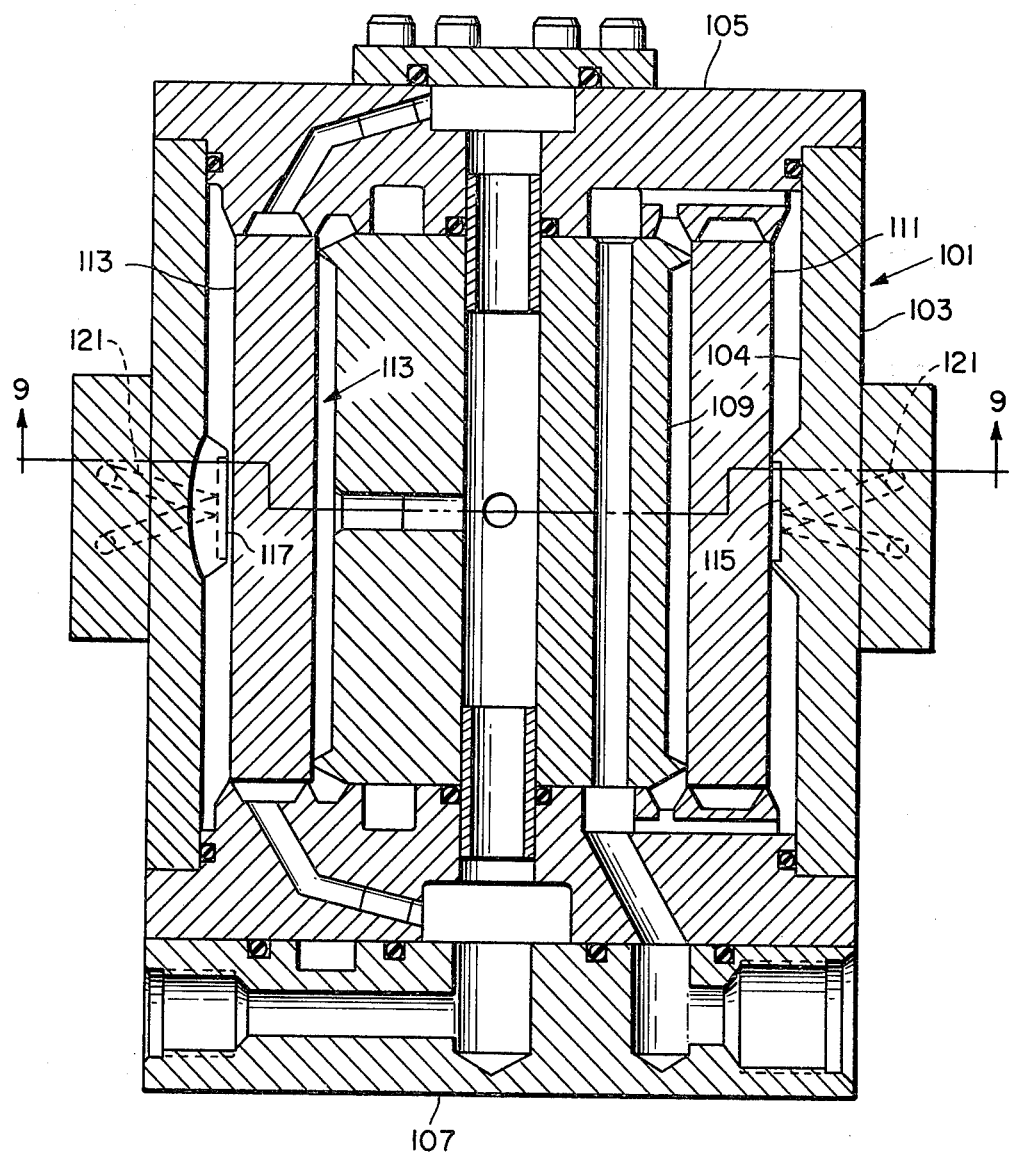

Referring to FIGS. 1 and 2 of the drawings, shown therein is a novel integrating accelerometer constructed according to the invention and having a housing 1 including a base 3 with a cylindrical reservoir 5 therein. An octangonal member 7 is secured to base 3 by screws 9 or other suitable means. The inner wall 11 of octagonal member 7 is cylinderical in shape and the cylindrical wall has a shallow groove 13 for the purpose described below. A hexagonal cover 15 is secured to octagonal member 7 by screws 17 or other suitable means.

An inertial mass or wheel 19 is positioned concentrically within the cylndrical portion of member 7 adjacent groove 13 and a channel is formed between housing 1 and the periphery of the inertial mass. The inertial mass is mounted on a spindle 21. The entire body 1 is filled with a viscous fluid, such as hydraulic oil, and the inertial mass is supported in the fluid by means of hydrostatic bearing 23. The channel is of laminar dimensions and the distance between inertial mass 19 and the base of groove 13 is preferably about 0.004 to 0.008 inches.

A passage 25 in member 7 connects groove 13 to ports 27 and 29 to the exterior of body 1. Likewise, a passage 31 in member 7 closely associated with passage 25 connects groove 13 to ports 33 and 35 to the exterior of body 1. Passage 25 has restrictors 37 and 39 therein adjacent ports 27 and 29, respectively, and passage 31 has restrictors 41 and 43 therein adjacent ports 33 and 35, respectively, for the purpose described hereinafter. A splitter or vane 45 is attached to member 7 and is positioned in the channel between passages 25 and 31 to block laminar flow in the channel when housing 1 rotates relative to inertial mass 19. A small clearance is provided between vane 45 and inertial mass 19. so there is no frictional restraint on the inertial mass.

A passage 47 in member 7 opposite vane 45 connects groove 13 to a port 49 to the exterior of body 1. Passage 47 has a funnel shaped portion 48 terminating in groove 13. If a proportional fluidic amplifier 51 is used its control ports are connected to passages 27 and 33 and the control ports may replace restrictors 37 and 41.

OPERATION

Assuming that inertial mass 19 is fixed inertially, as housing 1 is rotated relative thereto the fluid in the channel adjacent the housing surface flows at the same velocity as the housing surface. The fluid next to inertial mass 19 is at zero velocity because the inertial mass is stationery. Viscous shear forces cause fluid to flow around the channel in the direction of rotation of the housing with an average velocity equal to one-half of the peripheral velocity of the channel. Fluid flow is diverted by vane 45 and the restrictors on one side of the vane cause a pressure build up and the restrictors on the other side of the vane cause a pressure reduction in the associated passages in proportion to fluid flow and to the angular velocity of housing 1. The differential pressure across vane 45 provides a signal corresponding to angular velocity of housing 1.

If the restrictors have infinite impedance the fluid flow Q when housing 1 rotates relative to inertial mass 19 at an angular velocity $\dot{\theta}$ is one-half of the peripheral velocity of the housing multiplied by the area of the channel. With a channel width $W$ and height $h$ located at a radius $r$ from the center of the housing the fluid flow Q is:

$$Q = \frac{rhW\dot{\theta}}{2} \quad (1)$$

In the present arrangement the restrictors have a finite impedance and the channel has internal resistance to flow because of viscous shear losses. The differential pressure $\Delta P$ across vane 45 is:

$$\Delta P = \frac{2Q}{g_r + g_o} = \frac{rhW\dot{\theta}}{g_r + g_o} \quad (2)$$

Where
$g_r$ is the conductance of the restrictors and
$g_o$ is the conductance of the channel The conductance $g_o$ is a fixed known quantity for any given design but varies inversely with the viscosity of the fluid which is likely to be temperature sensitive. As temperature increases $g_o$ becomes larger with the resultant loss of sensor gain unless $g_r$ is made to compensate. The restrictor may be considered an orifice and its conductance does not depend on fluid viscosity so that restrictor conductance $g_r$ remains substantially constant with varying temperatures, thus minimizing the change in signal gain with temperature. Also, a restrictor conductance $g_r$ is nonlinear and is a function of fluid flow Q through the restrictor.

To overcome these problems fluid from a biasing circuit, including a source of fluid under pressure, is combined with fluid in the channel caused by rotation of the housing relative to the inertial mass and the biased flow passes through the restrictors. By making the bias flow, particularly the bias flow through the restrictors, considerably larger than the channel flow the restrictor conductance $g_r$ is substantially linear and changes in temperature have little effect on the quiescent values of flow and pressure and $g_r$ is substantially constant. Calculations show that if $g_r$ is twice the value of $g_o$ with fluid temperature at 210° F the signal gain is 3 decibels more when the fluid temperature is 70° F. Larger values of $g_r$ reduce signal gain change with changes in temperature even more.

To compensate for change in signal gain with change in temperature several biasing arrangements for combining bias flow from the pressure source with fluid flow in the channel resulting from relative movement of the housing and inertial mass are shown in FIGS. 4 to 7.

FIG. 4 shows an arrangement for forward biasing fluid flow in the channel. A fluid pressure source $P_b$ is connected to port 49 and the bias flow divides and flows through the channel in opposite directions to restrictors 37 and 41. In one direction fluid flow caused by rotation of the housing 1 adds to the bias flow and in the other direction subtracts from the bias flow and the differential pressure $\Delta P$ across vane 45 is a signal corresponding to angular velocity of the housing.

FIG. 5 shows an arrangement for reverse biasing fluid flow in the channel. A fluid pressure source $p_b$ is connected to ports 29 and 35 to provide bias flow through restrictors 39 and 43, respectively, and through the channel in opposite directions to port 49. The arrangement of FIG. 5 operates similarly to the arrangement of FIG. 4 except that bias flow in the channel is opposite to that in FIG. 4. Fluid flow in the channel caused by rotation of the housing adds to the bias flow from one port and subtracts from the bias flow from the other port and the differential pressure $\Delta P$ across vane 45 provides a signal corresponding to angular velocity of the housing.

FIG. 6 shows an arrangement which may be considered "no biasing" of fluid flow in the channel. This arrangement is similar to that shown in FIG. 5 except that no port 49 is provided in FIG. 6 as in FIG. 5. A bias pressure source is connected to ports 29 and 35 as in FIG. 5 and the differential pressure $\Delta P$ across vane 45 provides a signal corresponding to angular velocity of the housing.

FIG. 7 shows another arrangement for forward biasing fluid flow in the channel. A fluid pressure source is connected to ports 29, 35 and 49. This arrangement operates similarly to the arrangement of FIG. 4 and in addition the flow at source restrictors 39 and 43 add to the biased flow at load restrictors 37 and 41. The differential pressure $\Delta P$ is less temperature sensitive than the arrangement shown in FIG. 4. The additional flow from ports 29 and 35 "swamp" the effects of channel flow due to changes in temperature. The flow from source restrictors 39 and 43 in FIGS. 5, 6 and 7 may be considerably larger than the biased flow from the channel.

While all biasing techniques result in substantially the same signal gain, the biased arrangements of FIG. 4 and FIG. 7 provide the best temperature compensation because as the fluid becomes hotter the quiescent pressure upstream of the load restrictors increases thus reducing the conductance of the load restrictors. Better temperature compensation is achieved from the use of swamp flow shown in FIG. 7.

Figure 9:
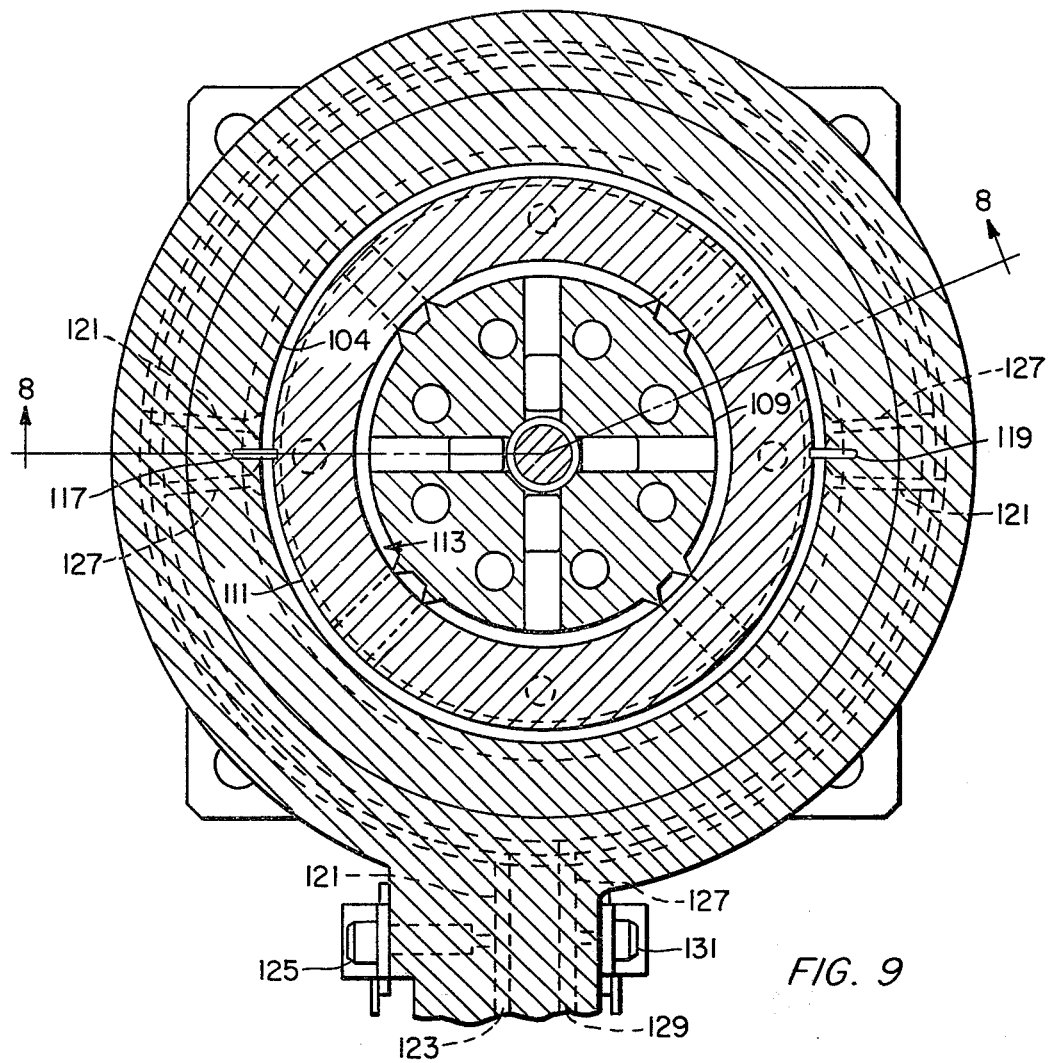

A second embodiment of the invention is shown in FIGS. 8 and 9 in which the integrating angular accelerometer has a cylindrical housing 101 having a cylindrical body 103 with caps 105 and 107 at its ends. The inner wall 104 of body 103 is substantially cylindrical in shape and a cylindrical member 109 of smaller diameter than inner wall 104 is positioned coaxially within body 103 between end caps 105 and 107 to provide an annular recess between the circular member and the inner wall 104 of body 103. A cylindrical inertial mass 111 is positioned in the housing in the annular recess between member 109 and wall 104 of body 103.

Housing 103 is filled with a viscous fluid, such as hydraulic oil, and inertial mass 111 is supported in the fluid by a hydrostatic bearing 113 between cylindrical member 109 and the inner surface of inertial mass 111 to provide for relative rotation between the inertial mass and housing.

Inner wall 104 has an annular groove 115 formed in a portion of the wall of smaller diameter than the remainder of the cylindrical surface to provide a channel between housing 101 and the periphery of the inertial mass. The channel is of laminar dimensions and the distance between inertial mass 111 and the base of groove 115 is preferably about 0.004 to 0.008 inches.

A pair of splitters or vanes 117 and 119 are fixedly attached to body 103 and are positioned in the channel diametrically opposite one another to block laminar flow in the channel when housing 101 rotates relative to inertial mass 111. A small clearance is provided between the vanes and inertial mass so there is no frictional restraint on the inertial mass. A passage 121 in body 103 connects groove 115 at one side of splitter 117 and at the opposite side of splitter 119 to ports 123 and 125, respectively. A passage 127 in body 103 connects groove 115 at the other sides of vanes 117 and 119 to ports 129 and 131, respectively. This arrangement in effect provides two parallel channels. Suitable restrictors may be used in the passages if needed as described in connection with the embodiment shown in FIGS. 1, 2 and 3.

The embodiment of the invention shown in FIGS. 8 and 9 operates in the same manner as in the embodiment of FIGS. 1, 2, 3 except that the two splitters or vanes provide parallel channels which avoid problems due to relative lateral vibration of the inertial wheel and housing because of lack of stiffness of the bearing. Each parallel channel in the embodiment shown in FIGS. 8 and 9 may be biased in the manner shown in FIGS. 4 to 7.

While the embodiment shown in FIGS. 8 and 9 has the hydrostatic bearing between cylindrical member 109 and the inner face of inertial mass 111 and has the channel between the outer face of the inertial mass and inner wall 104 of body 103, it should be understood that the hydrostatic bearing may be provided between the outer face of inertial mass 111 and inner wall 104 of body 103 and the channel between the inner face of the inertial mass and cylndrical member 109.

Since the inertial mass is floated on hydrostatic low friction bearing very slow turning rates of the vehicle over a prolonged period of time may cause rotation of the inertial mass because of viscous coupling. If this occurs it may be necessary periodically to cage the inertial mass by suitable means to avoid a steady velocity component.

Caging may be desirable in some applications, such as weapon systems, because the hydrostatic bearings may mechanically bottom when firing the weapon because of the high g loads. Pressure to the bearings should be withdrawn following firing until the vehicle is at rest. The bearings then should be repressurized for refloating the inertial mass. Also, the hydrostatic bearings can be designed to withstand maximum shocks but higher flow rates will be required. With the vehicle at rest depressurize the bearing and then repressurize. Given sufficient rest time, 1 to 3 seconds, the inertial mass will stop rotating simply due to viscous drag.

Figure 10:
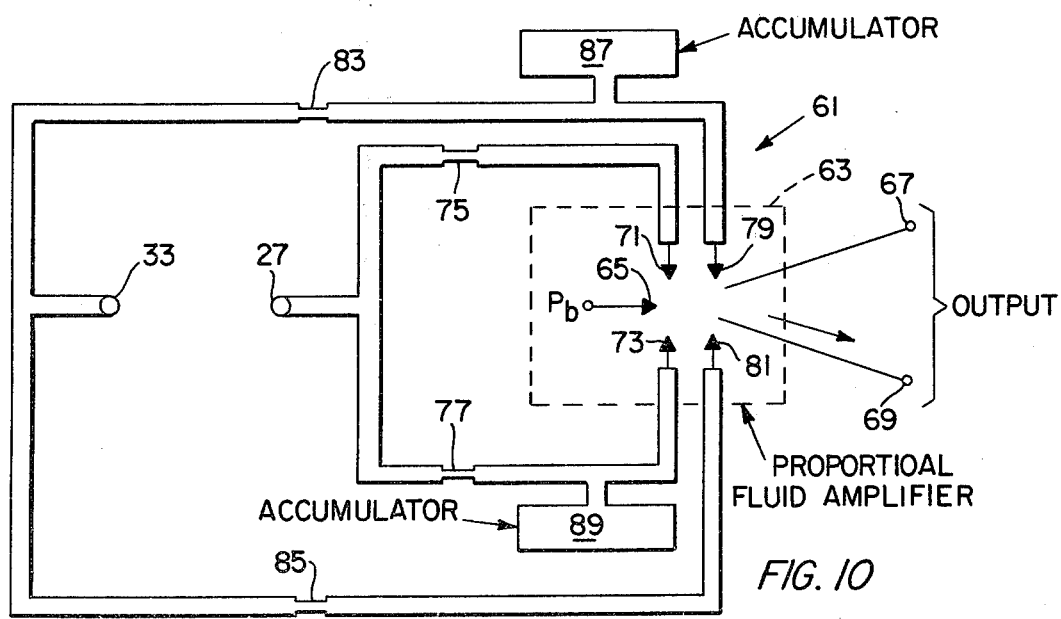

An alternate to caging is to use a low frequency wash out circuit, which may be fluidic, as shown in FIG. 10, so that if steady turning of the inertial mass should occur with a resulting steady differential pressure output this information would be blocked by the wash out circuit and not be included in the angular rate signal. The wash out circuit 61 shown in FIG. 10 comprises a proportional fluidic amplifier 63 having a pressure source $P_b$ for providing fluid under pressure through a jet 65 directed to two outputs 67 and 69. One pair of opposing jets 71 and 73 are connected through restrictors 75 and 77, respectively, to port 27 and two opposing jets 79 and 81 are connected through restrictors 83 and 85, respectively, to port 33 of the integrating angular accelerometer. An accumulator 87 is connected in the fluidic circuit between restrictor 83 and jet 79 and an accumulator 89 is connected in the fluidic circuit between restrictor 77 and jet 73. With this arrangement at very low frequencies accumulators 87 and 89 pressurize the associated fluidic circuits so that no fluid from the pressure source $P_b$ is transmitted to the outputs. The pressures in the accumulators 89 and 87 are the same as the steady pressure at ports 27 and 33. At high frequencies the differential pressure at ports 27 and 33 directs the fluid from jet 65 connected to source $P_b$ to one or the other of the outputs 67 or 69 in accordance with the differential pressure across ports 27 and 33.

When steering a vehicle using a navigation system or sighting a weapon prolonged angular rates are not likely to occur and caging means or wash out circuits are not necessary.

An integrating angular accelerometer constructed according to the invention provides angular rate signals free of noise. The device is simple in construction in that it comprises only two parts; the inertial mass supported by a hydrostatic bearing and a housing filled with viscous fluid.

While the invention has been decribed using a hydrostatic bearing, low friction bearings, such as ball or roller bearings may be used where dead band requirements are not severe. Dead band is caused by breakout friction of the bearing. Also, a flexural support, such as a clock spring or flex pivot, may be used. The spring rate must be low so that at higher frequencies the inertial mass tends to stay at rest. The hydrostatic bearing is preferred for high performance, but the other supports are lower in cost.

What is claimed is:

1. An integrating angular accelerometer for measuring angular rate of a rotating body, comprising a housing, an inertial mass positioned in the housing and arranged for relative rotation with respect to the housing, a viscous fluid in the housing, the inertial mass and housing forming an annular channel therebetween located about the acceleration sensitive axis and dimensioned to cause fluid flow upon relative rotation of the housing and inertial mass in the direction of relative rotation, means for blocking fluid flow in the channel to provide a differential pressure across the block means corresponding to relative angular rotation of the inertial mass and housing, and means for sensing the differential pressure across the blocking means to provide a signal corresponding thereto.

2. An integrating angular accelerometer as described in claim 1 in which the inertial mass is supported by the viscous fluid in the housing.

3. An integrating angular accelerometer as described in claim 1 having a hydrostatic bearing for providing relative rotation between the inertial mass and housing.

4. An integrating angular accelerometer as described in claim 1 having means connected to the channel at opposite sides of the channel blocking means for providing outputs corresponding to the pressures at the sides of the channel blocking means.

5. An integrating angular accelerometer as described in claim 4 in which the output means includes a passage connected to the channel at each side of the blocking means and a restrictor in each channel.

6. An integrating angular accelerometer as described in claim 5 having fluidic biasing means including a pressure source connected to the passages upstream of the restrictors for biasing the output.

7. An integrating angular accelerometer as described in claim 6 having a passage connected to the channel opposite to the blocking means and bias flow is from the pressure source through the channel in opposite directions towards the passage.

8. An integrating angular accelerometer as described in claim 1 having fluidic means biasing fluid flow to augment the pressure at least on one side of the blocking means.

9. An integrating angular accelerometer as described in claim 8 in which the fluidic biasing means augments the pressure at both sides of the blocking means.

10. An integrating angular accelerometer as described in claim 9 in which the fluidic biasing means includes a pressure source connected to the channel for providing fluid under pressure in the channel so that bias flow is increased by fluid flow caused by relative rotation of the housing and inertial mass at one side of the blocking means and is decreased thereby at the other side of the blocking means.

11. An integrating angular accelerometer as described in claim 10 having a passage connected to the channel opposite the blocking means and the pressure source is connected to the channel at opposite sides of the blocking means to provide bias flow from the blocking means through the channel in opposite directions to the passage opposite the blocking means.

12. An integrating angular accelerometer as described in claim 10 having means for introducing bias flow into the channel opposite to the blocking means and the bias flow in the channel divides in opposite directions towards the blocking means.

13. An integrating angular accelerometer as described in claim 12 having a passage connected to the channel at each side of the channel blocking means and a restrictor in each passage, the biasing pressure source being connected to the passages upstream of the restrictors for biasing the pressure at each side of the channel blocking means.

14. An integrating angular accelerometer as described in claim 1 in which the channel between the inertial mass and the housing is dimensioned to provide laminar fluid flow.

15. An integrating angular accelerometer as described in claim 1 including a fluidic amplifier connected to the channel at opposite sides of the channel blocking means.

16. An integrating angular accelerometer as described in claim 1 in which the differential pressure across the blocking means corresponds to relative angular rate of the inertial mass and housing.

17. An integrating angular accelerometer as described in claim 1 in which the inertial mass is stationary and the housing rotates relative to the inertial mass.

18. An integrating angular accelerometer as described in claim 17 having means for correcting for rotation of the inertial mass due to viscous coupling between the inertial mass and housing.

19. An integrating angular accelerometer as described in claim 18 in which the means for correcting for rotation of the inertial mass includes means for caging the inertial mass.

20. An integrating angular accelerometer as described in claim 18 in which the means for correcting for rotation of the inertial mass includes a low frequency "washout" circuit for blocking the corresponding differential pressure.

21. An integrating angular accelerometer as described in claim 1 having means for providing two channels connected in parallel to provide differential pressures across the blocking means corresponding to relative angular rotation of the inertial mass and housing to avoid errors resulting from lateral vibration of the inertial mass relative to the housing.

22. An integrating angular accelerometer as described in claim 21 in which the means for providing two channels connected in parallel includes means for blocking fluid flow at opposite sides of the channel.

23. An integrating angular accelerometer as described in claim 22 in which the means for blocking fluid flow includes two vanes positioned diametrically opposite to one another in the channel.

24. An integrating angular accelerometer as described in claim 1 in which the housing has a body with a cylindrical inner wall, and a cylindrical member of smaller diameter than the inner wall is positioned coaxially within the body to provide an annular recess between the cylindrical member and the inner wall, and the inertial mass is positioned in the housing in the annular recess.

25. An integrating angular accelerometer as described in claim 24 in which the channel is formed between one surface of the inertial mass and a bounding wall of the annular recess.

26. An integrating angular accelerometer as described in claim 25 having a hydrostatic bearing for providing relative rotation between the inertial mass and housing positioned and arranged between the other surface of the inertial mass and the other bounding wall of the annular recess.

27. An integrating angular accelerometer as described in claim 24 in which the channel is formed between the inner wall of the body and the associated surface of the inertial mass and a hydrostatic bearing for providing relative rotation between the inertial mass and housing is positioned and arranged between the other surface of the inertial mass and the cylindrical member.

28. An integrating angular accelerometer as described in claim 1 in which fluid flow upon relative rotation of the housing and inertial mass is caused by viscous forces only.

* * * * *